United States Patent [19]

Pease

[11] 3,815,084

[45] June 4, 1974

[54] RETROREFLECTIVE ADDRESSING TECHNIQUE

[75] Inventor: Logan L. Pease, Bountiful, Utah

[73] Assignee: Eaton Corporation, Cleveland, Ohio

[22] Filed: Nov. 19, 1971

[21] Appl. No.: 200,485

[52] U.S. Cl............................ 340/23, 214/16.4 A
[51] Int. Cl............................................ G08g 1/12
[58] Field of Search ........ 340/22, 23, 31 R, 32, 33, 340/34, 38 P; 179/1 VE; 343/6.5 SS; 250/199, 223 R; 356/153, 172; 214/16.4 A; 104/88; 246/29 R

[56] References Cited
UNITED STATES PATENTS

| | | | |
|---|---|---|---|
| 2,988,127 | 6/1961 | Devol, Jr. ....................... | 214/16.4 A |
| 3,225,177 | 12/1965 | Stites et al. ....................... | 250/199 |
| 3,253,126 | 5/1966 | Baughman....................... | 343/6.5 SS |
| 3,402,836 | 9/1968 | Debrey et al. ................. | 214/16.4 A |
| R26,548 | 3/1969 | Thomas ....................... | 250/199 |
| 3,486,640 | 12/1969 | Lemelson....................... | 214/16.4 A |
| 3,633,158 | 1/1972 | Heibel................................ | 340/34 |
| 3,638,575 | 2/1972 | Griner............................ | 214/16.4 A |
| 3,690,479 | 9/1972 | Castaldi ......................... | 214/16.4 A |
| 3,691,398 | 9/1972 | Burch ............................ | 214/16.4 A |
| 3,695,463 | 10/1972 | Weisker et al................. | 214/16.4 A |

OTHER PUBLICATIONS

Robert J. Barber, "21 Ways to Pick Data off Moving Objects," Oct. 1963, Control Engineering, pages 82–86.

Primary Examiner—Kathleen H. Claffy
Assistant Examiner—Randall P. Myers
Attorney, Agent, or Firm—Teagno & Toddy

[57] ABSTRACT

An optical addressing system for controlled vehicles comprising an address strip mounted adjacent a desired location and formed with a plurality of possible code positions selectively coated with retroreflective material to provide an optical binary address designation, together with a plurality of sensing heads carried by the controlled vehicle and each serving to direct a collimated light beam toward said address strip and to establish an electrical signal in response to reflection of said light beam by said address strip. Both method and apparatus are disclosed.

5 Claims, 3 Drawing Figures

RETROREFLECTIVE ADDRESSING TECHNIQUE

BACKGROUND

1. Field of Invention

This invention relates to automatic control systems and is particularly directed to a technique employing retroreflective means for determining and indicating the location of an automatically controlled vehicle or the like.

2. Prior Art

In the automatic control of vehicles, it is frequently necessary to provide means for determining the location of a controlled vehicle and for indicating the location to the controlling computer, or the like, which may be on board or remote from the controlled vehicle. Numerous techniques have been proposed heretofore for accomplishing this. However, none of the prior art techniques have been entirely satisfactory. Many of the prior art address determining systems have been bulky, complex and expensive. Other systems have not been compatible with digital data systems and, consequently, have not lent themselves to computer control. Still other systems have employed groups of rigid fingers, mounted adjacent a desired location, which could be sensed by mechanical, magnetic or optical means. However, such fingers often become bent or broken and, hence, tend to provide erroneous information. Some optical addressing systems have been proposed. However, these have generally employed conventional reflectors which tend to disperse the reflected light and which may reflect light from random sources in such a manner as to provide erroneous address information. Moreover, many of these prior art addressing systems have provided general, rather than precise, address information. This general information is inadequate, however, where precise positioning of the vehicle is required. Thus, for example, where a vehicle is required to receive material from or deposit material into a chute having dimensions substantially equal to those of the vehicle.

BRIEF SUMMARY AND OBJECTS OF THE INVENTION

These disadvantages of the prior art are overcome with the present invention and a novel addressing system is provided which permits extremely precise positioning of the controlled vehicle and discriminates against stray lights, yet is simple, compact and inexpensive and is compatible with computer control.

The advantages of the present invention are preferably attained by providing an address strip mounted adjacent the desired location and formed with a plurality of code positions which are selectively coated with retroreflective material, together with a plurality of sensing heads carried by the vehicle and each comprising a source of collimated light and a photocell positioned to sense reflection of said collimated light along the path of incidence and serving to emit an electrical signal in response to sensing of such light.

Accordingly, it is an object of the present invention to provide an improved addressing technique for controlled vehicles.

Another object of the present invention is to provide an improved optical addressing technique.

A further object of the present invention is to provide an optical addressing technique which discriminates against light from random sources.

An additional object of the present invention is to provide an addressing technique which permits extremely precise positioning of controlled vehicles.

Another object of the present invention is to provide an addressing system for controlled vehicles which is simple, compact and inexpensive.

A specific object of the present invention is to provide an addressing system for controlled vehicles comprising an address strip mounted adjacent a desired location and formed with a plurality of code positions which are selectively coated with retroreflective material, together with a plurality of sensing heads carried by the vehicle and each comprising a source of collimated light and a photocell positioned to sense reflection of said collimated light along the path of incidence and serving to emit an electrical signal in response to sensing of such light.

These and other objects and features of the present invention will be apparent from the following detailed description taken with reference to the accompanying drawings.

DETAILED DESCRIPTION OF THE ILLUSTRATED EMBODIMENT

Figure 1:
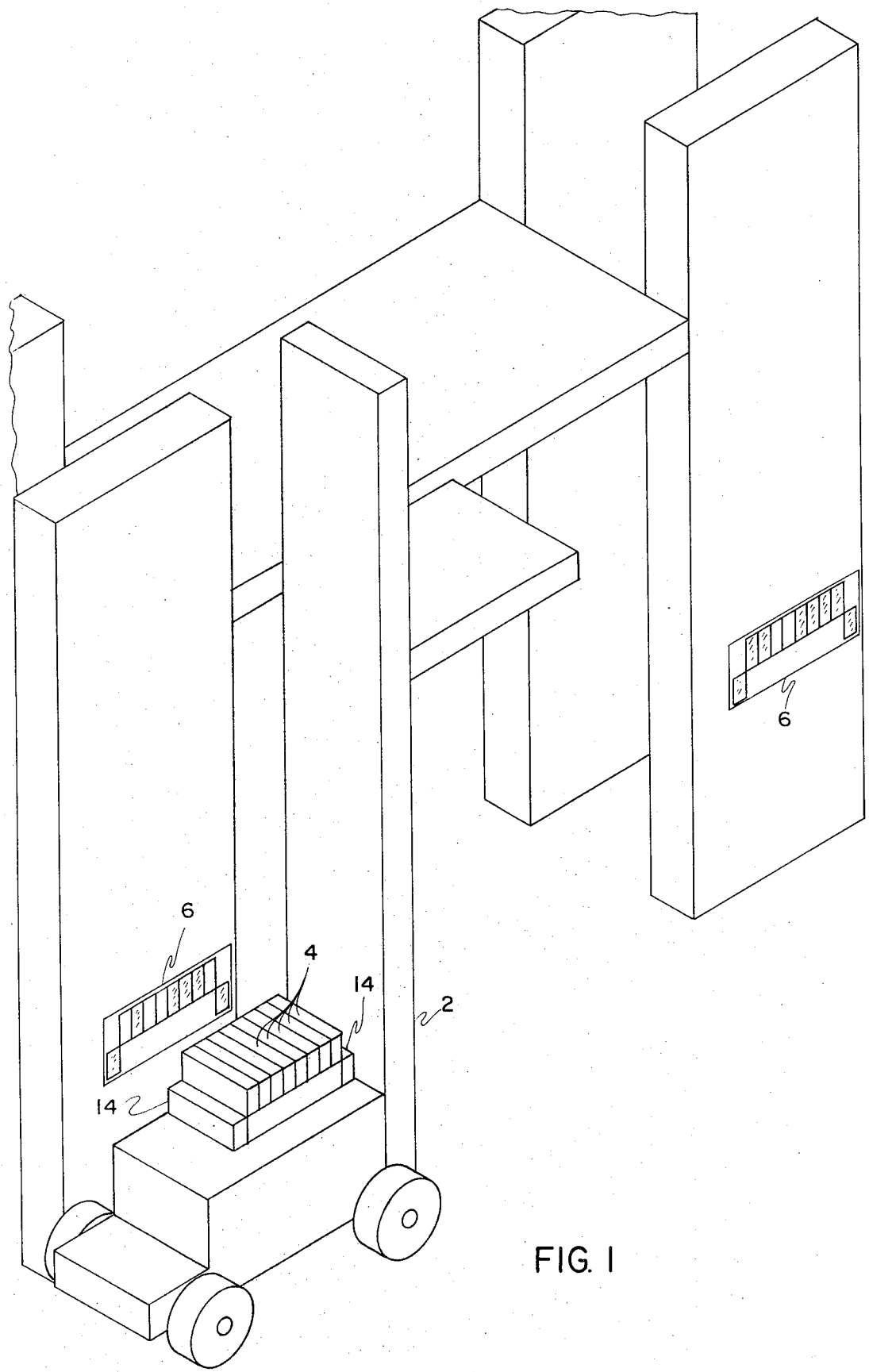
FIG. 1 is an isometric view of a controlled vehicle employing the addressing system of the present invention.

In that form of the present invention chosen for purposes of illustration, FIG. 1 shows a stacker crane 2, controlled by a remotely located computer, not shown, having a plurality of photoelectric sensing heads 4 mounted thereon which are positioned to emit light beams toward and sense light reflected from address strips 6 which are mounted adjacent desired locations in a warehouse or the like.

Figure 2:
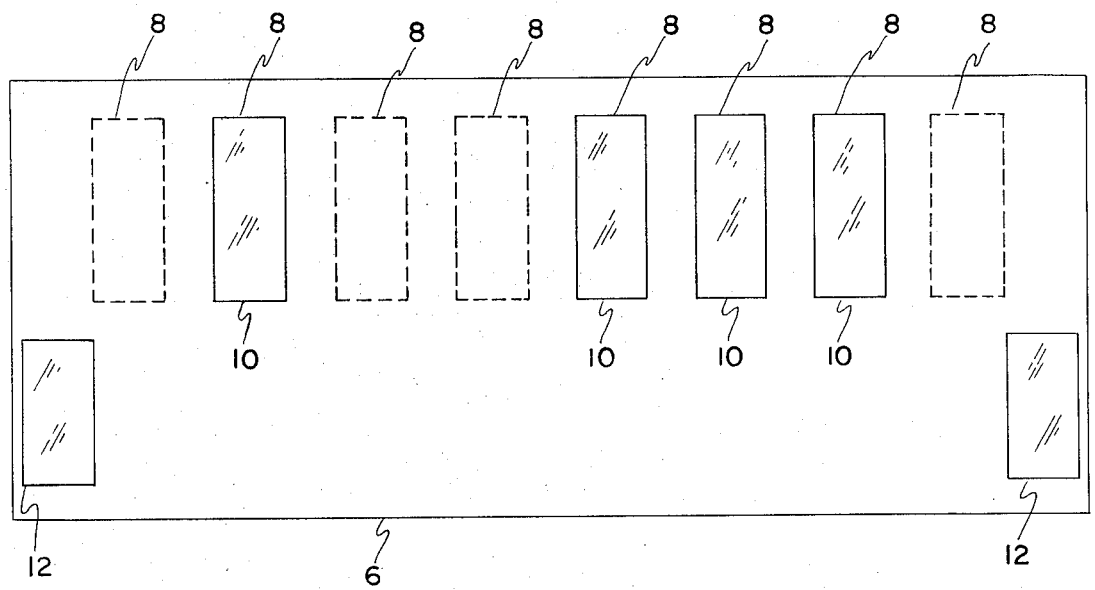
FIG. 2 is a front elevation of the address strip of the addressing system of FIG. 1.

As best seen in FIG. 2, each of the address strips 6 is formed with a plurality of possible code positions 8 which are selectively coated, as indicated at 10, with retroreflective material, such as "Scotchlite" reflective sheeting, available from the Reflective Products Division, 3M Company, St. Paul, Minnesota. The code positions 8 are preferably disposed in a row, as shown, and two additional retroreflectively coated positions 12 are provided offset from the row 8 adjacent respective ends of the address strip 6. As shown in FIG. 1, the number of the sensing heads 4 carried by the crane 2 is equal to the number of code positions 8 on the address strips 6 and two additional sensing heads 14 are carried by the crane 2 offset from the sensing heads 4. The sensing heads 4 are positioned to sense light reflected from the code positions 8 of the address strips 6, while the sensing heads 14 are positioned to sense light reflected from the retroreflectively coated positions 12 of the address strips 6.

Figure 3:
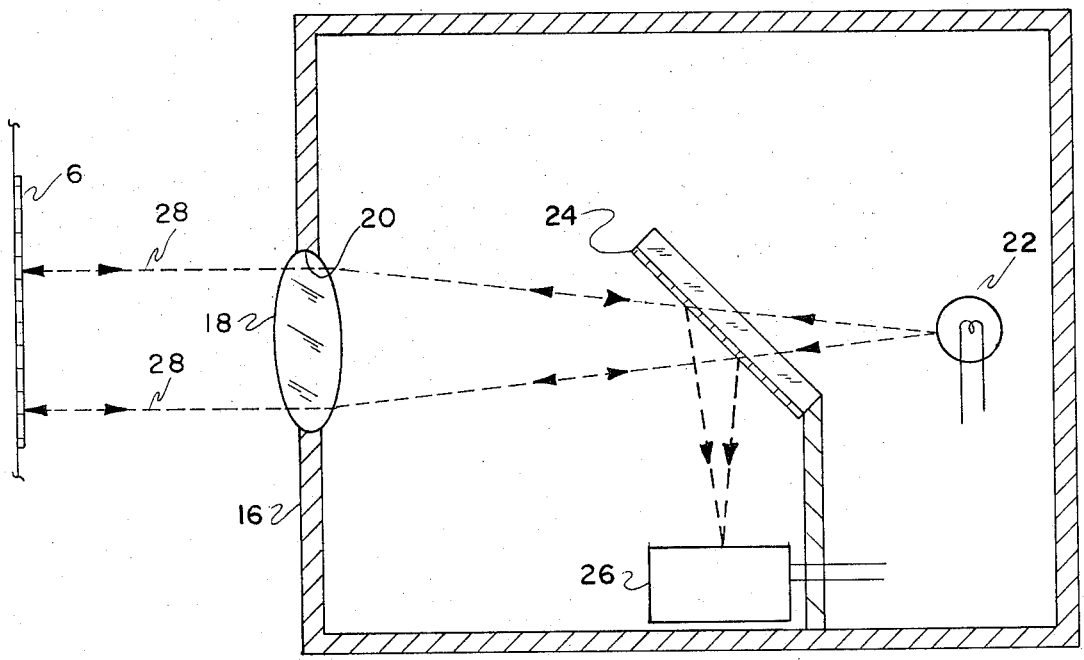
FIG. 3 is a diagrammatic representation of the addressing system of FIG. 1.

The sensing heads 4 and 14 are identical and, as seen in FIG. 3, each of the sensing heads comprises a housing 16 having a collimating lens 18 mounted in an opening 20 formed in one wall of the housing 16.

Within the housing 16, a light source, such as lamp 22, is mounted at the focal point of lens 18 and a half-silvered mirror 24 is interposed between lamp 22 and lens 18 and is inclined with respect to the optical axis of lens 18. A photocell 26 is positioned to sense light reflected from mirror 24 and serves to emit an electrical signal upon sensing such light.

In use, light from lamp 22 passes through half-silvered mirror 24 and is collimated by lens 18 into a parallel beam 28 which is directed toward the address strips 6. It is a characteristic of retroreflective materials that they reflect incident beams of light only back along the path of incidence. Consequently, the retroreflectively coated code positions 10 and retroreflectively coated positions 12 of the address strips 6 will reflect the light beam 28 back through lens 18 to half-silvered mirror 24 which reflects the light onto photocell 26. Because of this characteristic of retroreflective materials, light incident on the address strips 6 from extraneous sources will be returned thereto and will not be directed to the sensing heads 4 and 14. Consequently, the photocells 26 will sense only light from the associated lamp 22 which has been reflected from the address strips 6. Moreover, because the light beam 28 is collimated by lens 18, precise registry between the sensing heads 4 and 14 and the address strips 26 must be obtained in order for the light to be reflected by the address strips 6. This permits extremely precise positioning of the crane 2.

As indicated above, the possible code positions 8 of the address strips 6 are selectively coated with retroreflective material, as indicated at 10. It will be seen that by appropriate selection of those possible code positions 8 to be coated, each of the address strips 6 may be made to provide a respective optical binary address designation which can be sensed by the sensing heads 4 and converted into electrical binary signals, by the photocells 26 thereof, for use by the controlling computer. The offset sensing heads 14 sense light reflected by the offset retroreflectively coated positions 12 and serve to provide strobe indications which advise that the bank of sensing heads 4 is precisely aligned with an address strip 6. Upon simultaneous detection of two strobe indications by sensing heads 14, the sensing heads 4 are actuated to sense the binary address designation of the address strip 6.

Obviously, numerous variations and modifications may be made without departing from the present invention. Accordingly, it should be clearly understood that the form of the present invention described above and shown in the accompanying drawing is illustrative only and is not intended to limit the scope of the invention.

What is claimed is:

1. An optical addressing system for providing location identifications to a controlled vehicle upon alignment of the controlled vehicle with a particular location along a predetermined path of vehicle travel comprising:
   a plurality of address strips mounted adjacent predetermined locations of the predetermined path with each of said strips comprising a plurality of selectively coated code positions indicative of said predetermined locations along the predetermined path, said code positions being mounted adjacent each other to form a linearly extending array,
   retroreflective material coating said selectively coated code positions of said address strips,
   a retroreflectively coated material strip mounted at each end of said array of code positions and offset therefrom to provide a pair of positioning indicators for the controlled vehicle at each of said plurality of address strips;
   collimated light means carried by the controlled vehicle allowing collimated light to be incident on both said offset positioning indicators and on said address strip when the vehicle is at a predetermined location,
   first photoelectric means carried by said vehicle for sensing when the controlled vehicle is in an aligned position with one of said address strip locations by sensing when both strips of said pair of positioning indicators are aligned with said first photoelectric means, said first photoelectric means serving to emit a control signal indicative of the alignment of the controlled vehicle, and
   second photoelectric means carried by said vehicle for sensing one of said address strips in response to said control signal by sensing said collimated light reflected by said code positions whenever said first photoelectric means senses the aligned position of the controlled vehicle with said pair of positioning indicators, said second photoelectric means serving to emit an electrical signal indicative of said sensed predetermined location in response to sensing of said light.

2. The system of claim 1 wherein said collimated light means includes:
   a plurality of sources of collimated light carried by said vehicle equal in number to the code positions on said address strip and each positioned to permit light therefrom to be incident on a respective one of said code positions, and said second photoelectric means includes a plurality of photoelectric means carried by said vehicle and each positioned to sense light from a respective one of said sources upon reflection thereof from said respective one of said code positions to allow identification of said predetermined locations.

3. The system of claim 1 wherein said collimated light means comprises:
   a housing having an opening formed in one wall thereof,
   a collimating lens mounted in said opening, and
   a lamp mounted at the focal point of said lens.

4. The system of claim 3 wherein said first photoelectric means comprises:
   a partially reflective mirror interposed between said lamp and said lens and inclined with respect to the optical axis of said lens, and
   a photocell mounted to sense light reflected by said partially reflective mirror.

5. The system of claim 1 wherein:
   said code positions, which are selectively coated with said retroreflective material, form an optical binary designation.

* * * * *